United States Patent
Zhong et al.

(10) Patent No.: US 12,464,205 B2
(45) Date of Patent: Nov. 4, 2025

(54) VIDEO PROCESSING METHOD AND APPARATUS, READABLE MEDIUM AND ELECTRONIC DEVICE

(71) Applicant: Beijing Bytedance Network Technology Co., Ltd., Beijing (CN)

(72) Inventors: Ke Zhong, Beijing (CN); Caiwen Lin, Beijing (CN); Yijie Li, Beijing (CN); Kun Chang, Beijing (CN); Zhenbang Sun, Beijing (CN); Qing Long, Beijing (CN); Liangjie Tang, Beijing (CN); Pingfei Fu, Beijing (CN); Zhaoqin Lin, Beijing (CN); Yan Li, Beijing (CN)

(73) Assignee: Beijing Bytedance Network Technology Co., Ltd, Beijing (CN)

( * ) Notice: Subject to any disclaimer, the term of this patent is extended or adjusted under 35 U.S.C. 154(b) by 0 days.

(21) Appl. No.: 17/885,459

(22) Filed: Aug. 10, 2022

(65) Prior Publication Data
US 2022/0385997 A1   Dec. 1, 2022

Related U.S. Application Data

(63) Continuation of application No. PCT/CN2021/076415, filed on Feb. 9, 2021.

(30) Foreign Application Priority Data

Apr. 2, 2020  (CN) .......................... 202010255900.6

(51) Int. Cl.
*H04N 21/8549* (2011.01)
*H04N 21/845* (2011.01)

(52) U.S. Cl.
CPC ..... *H04N 21/8549* (2013.01); *H04N 21/8456* (2013.01)

(58) Field of Classification Search
CPC .......... H04N 21/8549; H04N 21/8456; H04N 21/44008
(Continued)

(56) References Cited

U.S. PATENT DOCUMENTS

| | | | | |
|---|---|---|---|---|
| 7,930,419 B2* | 4/2011 | Mullig | .................. | H04L 65/612 |
| | | | | 709/231 |
| 8,503,770 B2* | 8/2013 | Suzuki | .................. | G06V 20/40 |
| | | | | 382/160 |

(Continued)

FOREIGN PATENT DOCUMENTS

| | | |
|---|---|---|
| CN | 104811787 A | 7/2015 |
| CN | 106303723 A | 1/2017 |

(Continued)

OTHER PUBLICATIONS

International Search Report issued in corresponding International Application No. PCT/CN2021/076415 dated Apr. 28, 2021.

(Continued)

*Primary Examiner* — Helen Shibru
(74) *Attorney, Agent, or Firm* — Astute IP Law Group

(57) ABSTRACT

The present disclosure relates to a video processing method and apparatus, a readable medium, and an electronic device. The method includes: acquiring a first highlight segment obtained by performing highlight recognition on a target video; displaying an editing page corresponding to the first target highlight segment in response to an editing instruction for a first target highlight segment, where the editing page is used by a user to perform an editing operation on the first target highlight segment; processing, according to the editing operation of the user, the first target highlight segment to obtain a second highlight segment; and posting the second highlight segment in response to receiving a posting instruction for the second highlight segment.

16 Claims, 10 Drawing Sheets

(58) Field of Classification Search
USPC .......................................................... 386/241
See application file for complete search history.

(56) References Cited

U.S. PATENT DOCUMENTS

| | | | |
|---|---|---|---|
| 9,953,034 B1 | 4/2018 | Parlikar | |
| 10,325,395 B2* | 6/2019 | Mckenzie | G06T 13/80 |
| 10,446,189 B2* | 10/2019 | Zukerman | H04N 21/8146 |
| 11,025,964 B2* | 6/2021 | Zheng | H04N 21/2187 |
| 11,263,482 B2* | 3/2022 | Schwartz | G06V 10/82 |
| 11,272,237 B2* | 3/2022 | Ojala | H04N 21/4345 |
| 12,112,774 B1* | 10/2024 | Hay | G06V 20/40 |
| 2010/0104146 A1* | 4/2010 | Momosaki | G11B 27/28 |
| | | | 382/118 |
| 2012/0087637 A1* | 4/2012 | Logan | H04N 21/25891 |
| | | | 386/241 |
| 2014/0376887 A1* | 12/2014 | Tijssen | G11B 27/34 |
| | | | 386/282 |
| 2015/0141140 A1 | 5/2015 | Lampe et al. | |
| 2018/0025078 A1 | 1/2018 | Quenneson | |
| 2019/0079941 A1* | 3/2019 | Sarkar | G06F 16/7864 |

FOREIGN PATENT DOCUMENTS

| | | |
|---|---|---|
| CN | 108062409 A | 5/2018 |
| CN | 108833969 A | 11/2018 |
| CN | 108924576 A | 11/2018 |
| CN | 109120987 A | 1/2019 |
| CN | 109547841 A | 3/2019 |
| CN | 109637561 A | 4/2019 |
| CN | 109640112 A | 4/2019 |
| CN | 109640173 A | 4/2019 |
| CN | 110798716 A | 2/2020 |
| CN | 111447489 A | 7/2020 |
| WO | 2014176470 A1 | 10/2014 |

OTHER PUBLICATIONS

First Chinese Office Action issued in corresponding Chinese Application No. 202010255900.6 dated Jan. 7, 2022.
Supplementary Search issued in corresponding Chinese Application No. 202010255900.6.
CN-Rejection issued in corresponding Chinese Application No. 202010255900.6 dated Jan. 7, 2022.
Extended European Search Report in EP21778706.8, mailed Jun. 21, 2023, 8 pages.

* cited by examiner

VIDEO PROCESSING METHOD AND APPARATUS, READABLE MEDIUM AND ELECTRONIC DEVICE

CROSS-REFERENCE TO RELATED APPLICATIONS

The application is a continuation of International Application No. PCT/CN2021/076415, filed on Feb. 9, 2021, which claims priority to Chinese Patent Application No. 202010255900.6, filed on Apr. 2, 2020, both of the applications are hereby incorporated by reference in their entireties.

TECHNICAL FIELD

The present disclosure relates to the field of video technology and, in particular, to a video processing method and apparatus, a readable medium, and an electronic device.

BACKGROUND

With the development of Internet technology, the number of users of a video platform, such as, a short video platform and a live broadcast platform, is increasing. Due to richness display contents of videos and good audio-visual experience, watching videos becomes a part of daily entertainment activities for people.

However, in the process of watching a video, if a content of the video is large and a time is long, the user may not be interested in watching the relatively lengthy video completely, which is not conducive to the sharing of the video and is not conducive to an interaction between users, so that the user experience is poor.

SUMMARY

The Summary is provided to introduce concepts in a simplified form, these concepts are described in detail in the following Description of embodiments. The summary is not intended to identify a key feature or an essential feature of the claimed technical solution, nor intended to be used to limit a scope of the claimed technical solution.

In a first aspect, the present disclosure provides a video processing method, including: acquiring a first highlight segment obtained by performing highlight recognition on a target video; displaying an editing page corresponding to the first target highlight segment in response to an editing instruction for a first target highlight segment, where the editing page is used by a user to perform an editing operation on the first target highlight segment; processing, according to the editing operation of the user, the first target highlight segment to obtain a second highlight segment; and posting the second highlight segment in response to receiving a posting instruction for the second highlight segment.

In a second aspect, the present disclosure provides a video processing apparatus, including: an acquiring module, configured to acquire a first highlight segment obtained by performing highlight recognition on a target video; a first displaying module, configured to display an editing page corresponding to the first target highlight segment in response to an editing instruction for a first target highlight segment, where the editing page is used by a user to perform an editing operation on the first target highlight segment; a first processing module, configured to process, according to the editing operation of the user, the first target highlight segment to obtain a second highlight segment; and a first posting module, configured to post the second highlight segment in response to receiving a posting instruction for the second highlight segment.

In a third aspect, the present disclosure provides a computer-readable medium having a computer program stored thereon, where the program implements the method provided in the first aspect of the present disclosure when executed by a processor.

In a fourth aspect, the present disclosure provides an electronic device, including: a storage apparatus having a computer program stored thereon; and a processing apparatus, configured to execute the computer program in the storage apparatus, to implement a step of the method provided in the first aspect of the present disclosure.

In a fifth aspect, the present disclosure provides a computer program product, including a computer program, where the computer program is stored in a readable storage medium, and at least one processor of an electronic device may read the computer program from the readable storage medium, the computer program is executed by the at least one processor to enable the electronic device to perform a step of the method provided by the first aspect of the present disclosure.

In a sixth aspect, the present disclosure provides a computer program which is stored in a readable storage medium, and at least one processor of an electronic device may read the computer program from the readable storage medium, and the computer program is executed by the at least one processor to enable the electronic device to perform a step of the method provided by the first aspect of the present disclosure.

Through the above technical solution, firstly, a first highlight segment obtained by performing highlight recognition on a target video is acquired, where the first highlight segment may be a spectacular segment in the target video. Furthermore, the terminal may provide an editing page for a user to perform an editing operation on the first target highlight segment. In this way, the user may edit and post a highlight segment that meet his own needs, so as to meet user needs and improve user experience. In addition, after the highlight segment is posted, a viewer may directly watch the highlight segment, that is, the highlight segment in the target video, which facilitates the video sharing by the viewer and improves viewing experience of the video.

Other features and advantages of the present disclosure will be described in detail in the following detailed description.

BRIEF DESCRIPTION OF THE DRAWINGS

The above and other features, advantages and aspects of various embodiments of the present disclosure will more apparent when taken in conjunction with the accompanying figures and with reference to the following detailed description. Throughout the figures, the same or similar reference numbers refer to the same or similar elements. It should be understood that the figures are schematic, where originals and elements are not necessarily drawn to scale. In the figures.

DESCRIPTION OF EMBODIMENTS

Figure 1:
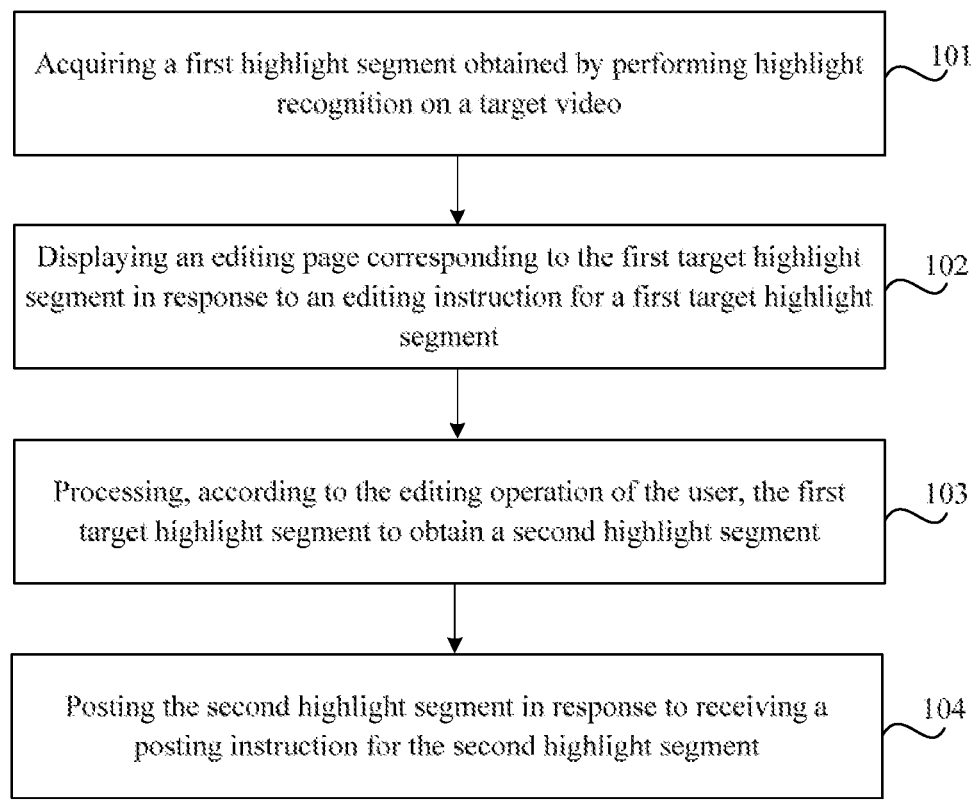
FIG. 1 is a flowchart of a video processing method according to an exemplary embodiment.

Embodiments of the present disclosure will be described in more detail below with reference to the accompanying drawings. Although certain embodiments of the present disclosure are shown in the drawings, it should be understood that the present disclosure may be implemented in various forms and should not be construed as being limited to the embodiments set forth herein. Instead, these embodiments are provided for a more thorough and complete understanding of the present disclosure. It should be understood that the drawings and embodiments of the present disclosure are only used for illustrative purposes, rather than limiting the protection scope of the present disclosure.

It should be understood that various steps described in a method embodiment of the present disclosure may be performed in different orders and/or in parallel. Furthermore, a method embodiment may include additional steps and/or omit performing an illustrated step. The scope of the present disclosure is not limited in this aspect.

The term "comprising" and variations thereof herein are openness comprising, i.e., "comprising but not limited to". The term "based on" is "based at least in part on". The term "an embodiment" means "at least one embodiment"; the term "another embodiment" means "at least one additional embodiment"; the term "some embodiments" means "at least some embodiments". Relevant definitions of other terms will be given in the description below.

It should be noted that the concepts of "first" and "second" mentioned in the present disclosure are only used to distinguish different apparatus, modules, or units rather than limiting an order or an interdependence of the functions performed by these apparatus, modules or units.

It should be noted that the modifiers of "one" and "multiple" mentioned in the present disclosure are illustrative rather than restrictive, and the person skilled in the art should understand that unless otherwise clearly indicated in the context, they should be interpreted as "one or more".

Names of messages or information exchanged between multiple apparatus in embodiments of the present disclosure are only for illustrative purposes rather than limiting the scope of these messages or information.

FIG. 1 is a flowchart of a video processing method according to an exemplary embodiment. The method may be applied to a terminal, such as, a smart phone, a tablet computer, a personal computer (PC), a notebook computer and other terminal devices. As shown in FIG. 1, the method may include S101 to S104.

In S101, acquiring a first highlight segment obtained by performing highlight recognition on a target video.

The target video may be a video shot by a user. For example, the target video may be a short video shot by the user through a terminal, or may be a live playback video recorded by the user during a live broadcast process on a live broadcast platform. It should be noted that, the present disclosure takes the target video as a live playback video as an example for illustration in the following introduction, which does not constitute a limitation to an implementation of the present disclosure.

During a live broadcast, a viewer may interact by commenting, sending a gift, etc., so that the target video may have a spectacular moment with a more active atmosphere. Performing the highlight recognition on the target video refers to recognizing a spectacular moment in the target video, and the first highlight segment obtained by performing the highlight recognition may be a spectacular segment in the target video. Among them, performing the highlight recognition on the target video may recognize one or more spectacular segments, and correspondingly, the first highlight segment acquired by the terminal may include one or more highlight sub-segments, where each highlight sub-segment is an independent video segment.

In S102, displaying an editing page corresponding to the first target highlight segment in response to an editing instruction for a first target highlight segment.

The first target highlight segment may be any highlight sub-segment in the first highlight segment, or may include multiple highlight sub-segments selected from multiple highlight sub-segments in the first highlight segment, which is not limited in the present disclosure. A user may select, according to his own needs, the first target highlight segment for editing. The terminal may provide an entry for editing the first target highlight segment, for example, the entry may be presented in a form of an editing button, and when the user operates the entry, such as clicking the editing button, an editing instruction for the first target highlight segment may be generated. After receiving the editing instruction input by the user, the terminal may display an editing page corresponding to the first target highlight segment, where the editing page may be used by the user to perform an editing operation on the first target highlight segment.

In S103, processing, according to the editing operation of the user, the first target highlight segment to obtain a second highlight segment.

Exemplarily, the editing operation of the user may be an operation, such as, a cropping and/or an effect processing on the first target highlight segment, where the effect processing includes, for example, operations such as an adding of a special effect, an adding of a sticker, and an adding of music. The terminal performs corresponding processing on the first target highlight segment according to the editing operation of the user, and the second highlight segment edited by the user may be obtained.

In S104, posting the second highlight segment in response to receiving a posting instruction for the second highlight segment.

Among them, the terminal may provide an entry for posting the second highlight segment. For example, the entry may be presented in a form of a posting button, and when the user operates the entry, such as clicking the posting button, the terminal may receive a posting instruction for the second highlight segment input by the user, and then the second highlight segment may be posted, for example, to a live broadcast platform, the Moments, or other video platforms.

Through the above technical solution, firstly, a first highlight segment obtained by performing highlight recognition on a target video is acquired, where the first highlight segment may be a spectacular segment in the target video.

Furthermore, the terminal may provide an editing page for a user to perform an editing operation on the first target highlight segment. In this way, the user may edit and post a highlight segment that meet his own needs, so as to meet user needs and improve user experience. In addition, after the highlight segment is posted, a viewer may directly watch the highlight segment, that is, the highlight segment in the target video, which facilitates the video sharing by the viewer and improves viewing experience of the video.

In the present disclosure, the highlight recognition of the target video may be performed locally by the terminal or by the server. Based on this, the terminal may acquire the first highlight segment obtained by performing the highlight recognition on the target video through the following two implementation manners.

In an embodiment in which the recognition is performed locally by the terminal, the terminal may first acquire the target video, for example, acquire a live playback video recorded by the user during a live broadcast process. After acquiring the target video, the terminal may perform the highlight recognition on the target video to obtain the first highlight segment.

In an embodiment in which the recognition is performed by the server, after acquiring the target video, the terminal may send the target video to the server, so that the server may perform the highlight recognition on the target video. After that, the server may feedback a highlight recognition result for the target video. The terminal may acquire the first highlight segment according to the highlight recognition result of the server.

Among them, the terminal or the server may perform the highlight recognition on the target video in various ways. In an embodiment, the terminal or server may perform the highlight recognition on the target video according to multiple preset highlight recognition conditions to obtain the highlight recognition result. The preset highlight recognition conditions may be the largest number of viewers, the largest number of comments, the largest number of gifts received, and the like. In another embodiment, the terminal or the server may input the target video into a pre-trained highlight recognition model, and the highlight recognition model may output the highlight recognition result.

For example, the highlight recognition result may include time period information corresponding to respective highlight sub-segment in the first highlight segment in the target video. For example, the target video is 60 minutes in total, and the time period information corresponding to respective highlight sub-segment in the target video may be 42:01~42:57, 45:03~45:56, 50:04~50:57, and so on. The terminal may extract respective highlight sub-segment from the target video according to the period information. Furthermore, in an implementation, the highlight recognition result may further include a highlight recognition condition that respective highlight sub-segment complies with respectively. Among them, if the terminal or the server performs recognition according to multiple preset highlight recognition conditions, the highlight recognition condition that the respective highlight sub-segment complies with respectively may be a preset highlight recognition condition corresponding to the recognition respectively. If the terminal or server is recognized by a highlight recognition model, the highlight recognition model may output not only time period information corresponding to respective highlight sub-segment in the target video, but also a highlight recognition condition that the highlight sub-segment complies with.

For example, a highlight sub-segment with corresponding time period information from 42:01 to 42:57 in the target video is recognized based on the largest number of viewers during a live broadcast, so the highlight recognition condition that the highlight sub-segment complies with may be the largest number of viewers. The highlight sub-segment with corresponding time period information from 45:03 to 45:56 in the target video is recognized according to the largest number of comments during the live broadcast, so the highlight recognition condition that the highlight sub-segment complies with may be the largest number of comments. The highlight sub-segment with corresponding time period information from 50:04 to 50:57 in the target video is recognized according to the largest number of gifts received during the live broadcast, so the highlight recognition condition that the highlight sub-segment complies with may be the largest number of gifts.

Figure 2A:
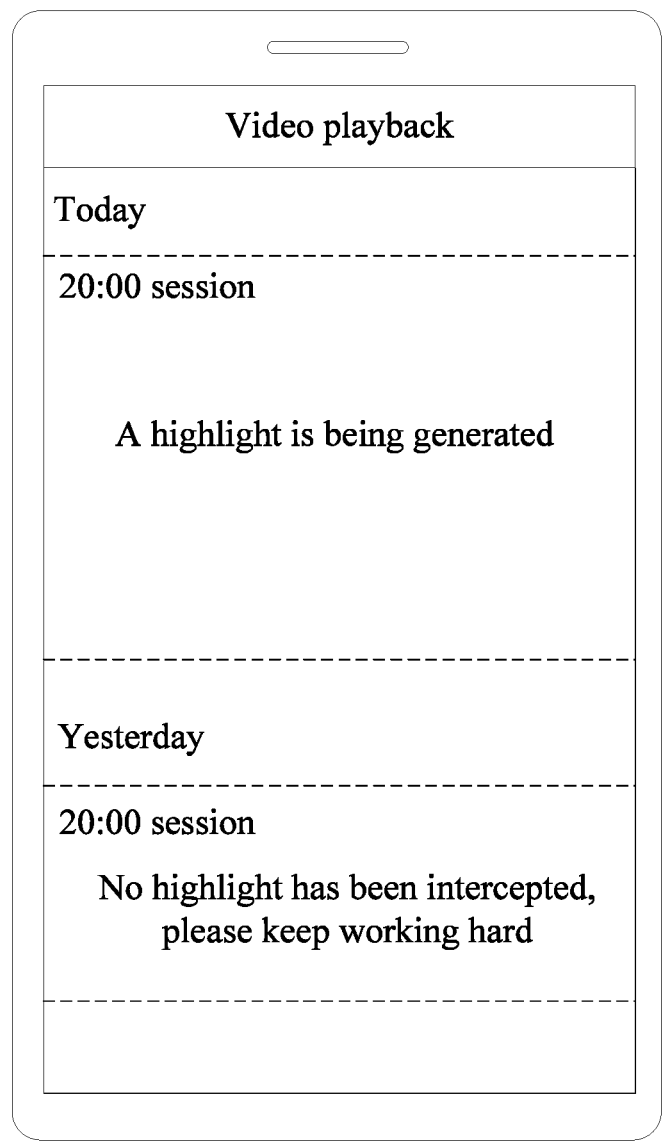
FIG. 2a is a schematic diagram of a video playback page according to an exemplary embodiment.

In the present disclosure, the terminal may display prompt information during a process of acquiring the first highlight segment, where the prompt information may be used to prompt that the user is performing highlight recognition on the target video. In an embodiment, the prompt information may be displayed in a form of a prompt box at a preset position of a page (e.g., at a top of the page), and the prompt content may be, for example, "A highlight is being generated". In another embodiment, the prompt information may be displayed on a video playback page, where the video playback page may provide highlight segment recognition results of different live broadcast sessions. The video playback page may be shown in FIG. 2a. In FIG. 2a, for a live playback video of today's 20:00 session, in the process of acquiring the first highlight segment, the terminal may display prompt information "A highlight is being generated" in the corresponding live session.

In addition, for a live playback video with less live content, short time, or low viewer activity, a highlight segment may not be recognized, so that the first highlight segment may not be obtained. At this time, the terminal may prompt the user, for example, may display prompt information for prompting the user that a highlight segment is not recognized from the target video. As shown in FIG. 2a, in a live playback video in yesterday's 20:00 session, the first highlight segment may not be acquired due to a lack of interaction among a live viewer, and prompt information indicating that a highlight segment is not recognized may be displayed in the live session.

After the above S101, that is, after the terminal acquires the first highlight segment obtained by performing the highlight recognition on the target video, the video processing method provided by the present disclosure may further includes:

displaying a video playback page, where the video playback page carries label information of the first highlight segment, and the label information is used to represent feature information of the first highlight segment.

Figure 2B:
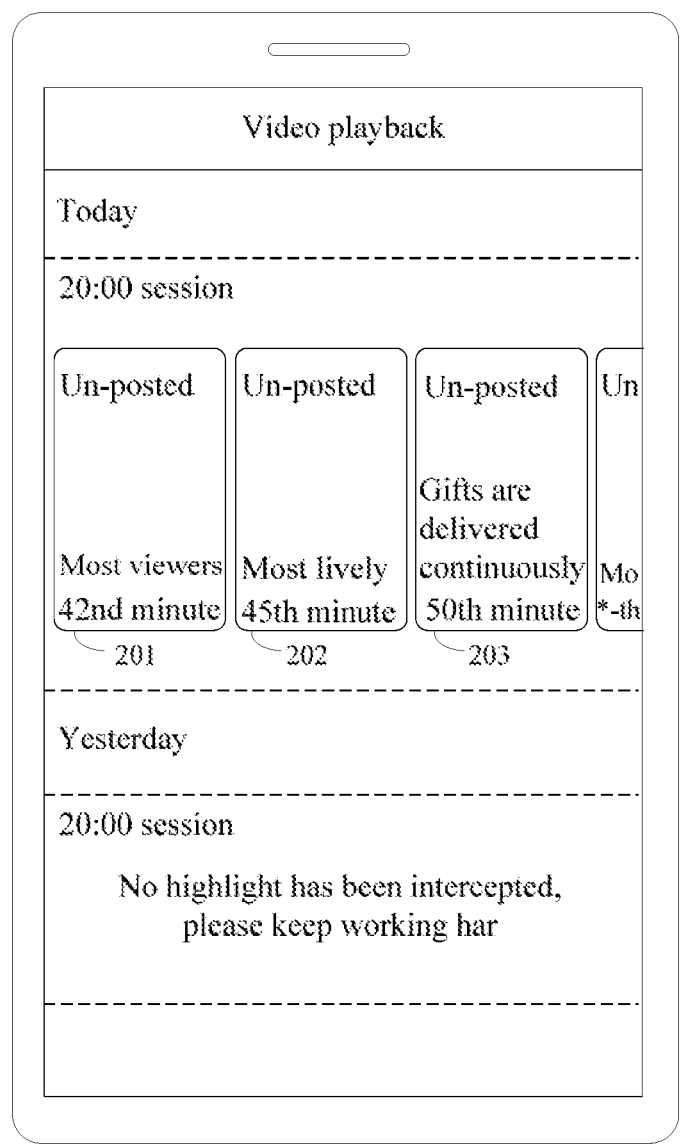
FIG. 2b is a schematic diagram of a video playback page according to another exemplary embodiment.

Among them, the video playback page may be as shown in FIG. 2b. For a live playback video of today's 20:00 session, the terminal may obtain the first highlight segment which may include multiple highlight sub-segments, such as, a highlight sub-segment 201, a highlight sub-segment 202, a highlight sub-segment 203, and other highlight sub-segments. Not all highlight sub-segments are displayed due to the limitation of the screen size of the terminal, and the user may swipe left and right to display different highlight sub-segments on the terminal. It should be noted that the present disclosure does not specifically limit the number of highlight sub-segments in the first highlight segment acquired by the terminal.

The video playback page as shown in FIG. 2b may carry label information of the first highlight segment. The label information may be used to represent feature information of the first highlight segment. Exemplarily, the label information may include one or more of the following: a cover image, a conformed highlight recognition condition, time information in the target video, and posting information used to indicate whether has been posted. Among them, the label information of the first highlight segment may include respective label information corresponding to multiple highlight sub-segments in the first highlight segment, and the respective label information corresponding to each highlight sub-segment may be used to represent feature information of the highlight sub-segment.

Among them, the cover image may be any image frame in the highlight sub-segment, which is not specifically limited in the present disclosure. For example, the first frame of the highlight sub-segment may be used as the cover image by default.

The conformed highlight recognition condition may be a reason for recognizing respective highlight sub-segment from the target video, for example, with the largest number of viewers, the largest number of gifts received, the largest number of comments in the target video, and so on. For example, as shown in FIG. 2b, the highlight recognition condition of the highlight sub-segment 201 may be the largest number of viewers, and the label information thereof may include "most viewers". The highlight recognition condition of the highlight sub-segment 202 may be the largest number of comments, and the label information thereof may include "most lively". The highlight recognition condition of the highlight sub-segment 203 may be the largest number of gifts received, and the label information may include "gifts are delivered continuously".

The time information in the target video may be, for example, the minute of the highlight sub-segment in the target video. For example, the time information of the highlight sub-segment 201 in the target video may be the 42nd minute. Of course, the present disclosure does not specifically limit the presentation form of the time information and the duration of respective highlight sub-segment, and the time information may further be, for example, time period information of the highlight sub-segment in the target video.

The posting information used to indicate whether has been posted may include posted and un-posted. If the user has posted the highlight sub-segment, the posting information may indicate that the highlight sub-segment has been posted; if the user has not posted the highlight sub-segment, the posting information may indicate that the highlight sub-segment has not been posted. For example, the posting information of the highlight sub-segments 201~203 shown in FIG. 2b is all un-posted.

In the present disclosure, the first target highlight segment may include multiple highlight sub-segments in the first highlight segment. In S102, before the displaying the editing page corresponding to the first target highlight segment in response to the editing instruction for the first target highlight segment, the video processing method provided by the present disclosure may further includes:

merging, according to a selecting operation of the user, the multiple highlight sub-segments to obtain the first target highlight segment.

Among them, the user can select which highlight sub-segment in the first highlight segments is used as the first target highlight segment according to his own needs. For example, the user selects the highlight sub-segment 201 and the highlight sub-segment 202, and the terminal may merge the multiple highlight sub-segments selected by the user according to a selection operation of the user to obtain the first target highlight segment. The present disclosure does not specifically limit an order of the respective highlight sub-segment in the first target highlight segment during merging. For example, in the merged first target highlight segment, the highlight sub-segment 201 may be before or after the highlight sub-segment 202.

In the present disclosure, before editing the first target highlight segment, the user may preview the first target highlight segment first. Therefore, before S102, the video processing method provided by the present disclosure may further includes:

in response to a preview instruction for the first target highlight segment, displaying a preview page corresponding to the first target highlight segment to play the first target highlight segment.

For example, the user may click a preview button for the first target highlight segment, or click on a cover image of the first target highlight segment, to generate a preview instruction for the first target highlight segment. After receiving the preview instruction, the terminal may display the preview page corresponding to the first target highlight segment to play the first target highlight segment.

Figure 2C:
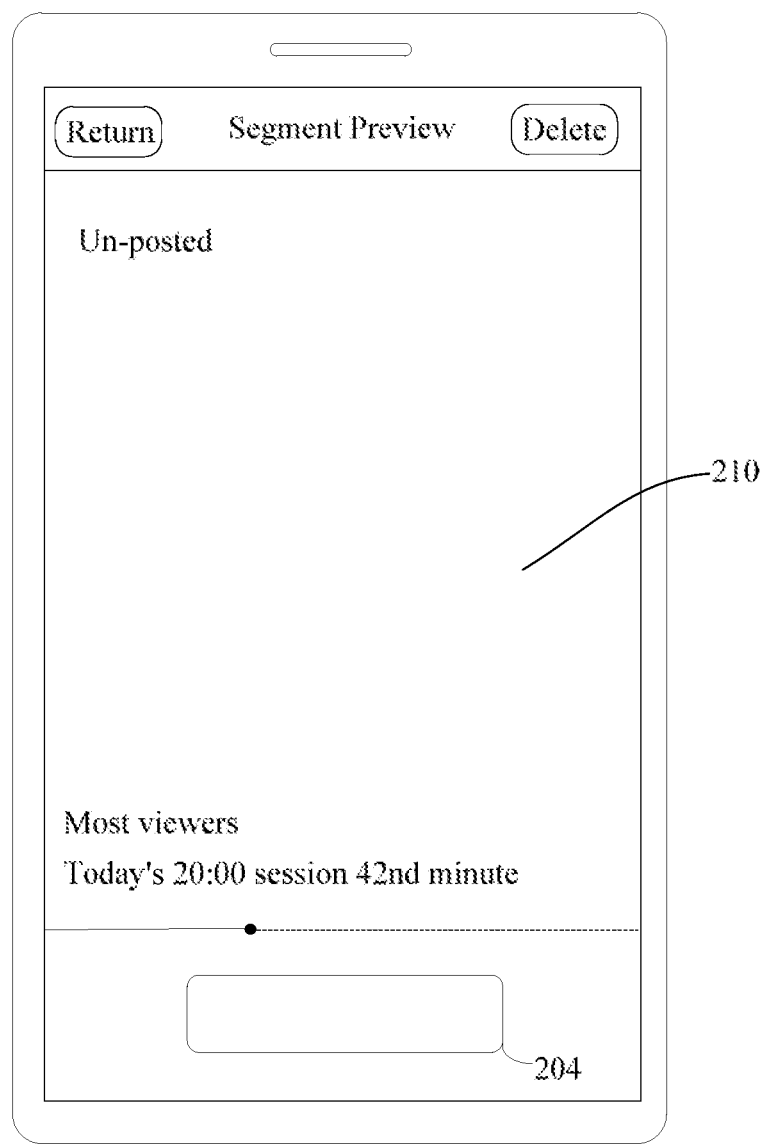
FIG. 2c is a schematic diagram of a preview page according to an exemplary embodiment.

Among them, the first target highlight segment may also be any highlight sub-segment in the first highlight segment. For example, taking the highlight sub-segment 201 in FIG. 2b as the first target highlight segment as an example, the user may click on the cover image of the highlight sub-segment 201, and after receiving the preview instruction for the first target highlight segment, the terminal may display the preview page as shown in FIG. 2c. The preview page may be used to play the first target highlight segment, where the area 210 may be used to play the highlight segment. The user may drag a progress bar at a bottom of the page to control the play of the first target highlight segment. The preview page may further include label information of the first target highlight segment. Moreover, the user may click a return button to return to a previous page, that is, the video playback page shown in FIG. 2b, or click a delete button to delete the first target highlight segment.

Figure 2D:
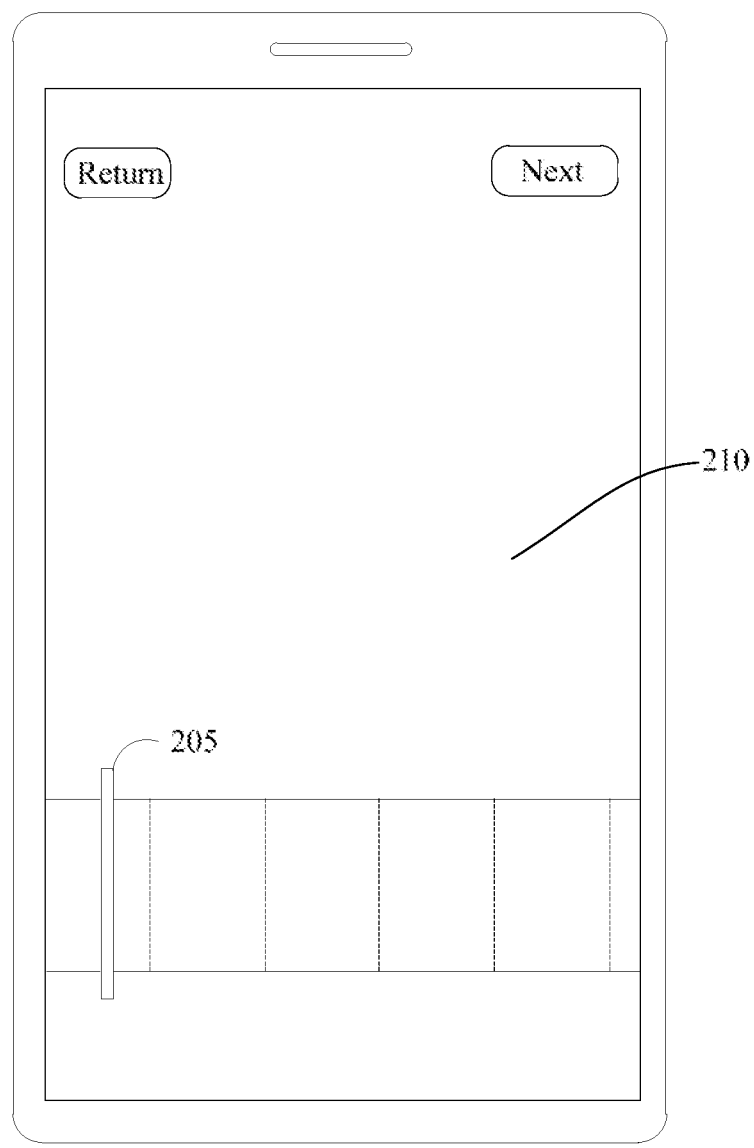
FIG. 2d is a schematic diagram of a segment cropping page according to an exemplary embodiment.

In addition, an editing entry for editing the first target highlight segment may also be provided in the preview page. Exemplarily, the editing entry may be presented in a form of an editing button, such as the editing button 204 in FIG. 2c. When the user operates the editing entry, for example, clicks the editing button 204, an editing instruction for the first target highlight segment may be generated. Among them, the editing operation of the user on the highlight segment may include a segment cropping and/or an effect processing, therefore, the editing page corresponding to the first target highlight segment may include a segment cropping page and an effect processing page. Exemplarily, after receiving the editing instruction, the terminal may first display the segment cropping page as shown in FIG. 2d. In the cropping page, the user may crop the first target highlight segment, for example, by dragging the slider 205 in FIG. 2d to crop.

Figure 2E:
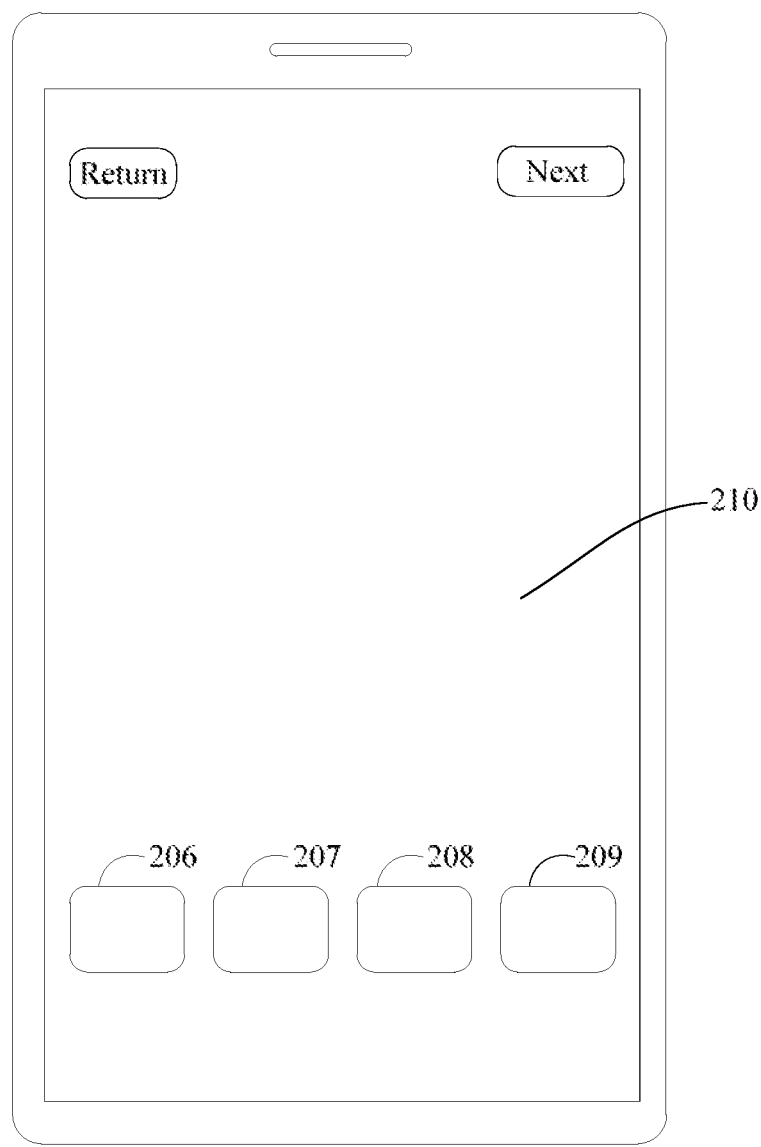
FIG. 2e is a schematic diagram of an effect processing page according to an exemplary embodiment.

After the cropping is completed, the user may click the next button in FIG. 2d to enter another editing page, for example, the terminal may display the effect processing page as shown in FIG. 2e. In the effect processing page, buttons 206~209 may respectively represent different processing effects. For example, button 206 may be used to add music to the first target highlight segment, button 207 may be used to add a special effect to the first target highlight segment, button 208 may be used to add a text content to the first target highlight segment, and button 209 may be used to add a sticker to the first target highlight segment. It should be noted that the effect processing represented by these four buttons is only illustrative, and the effect processing on the highlight segment in the present disclosure is not limited to these four effects.

The terminal may process the first target highlight segment according to the editing operation such as a segment cropping and an effect processing of the first target highlight segment by the user, so as to obtain a second highlight segment edited by the user.

Figure 2F:
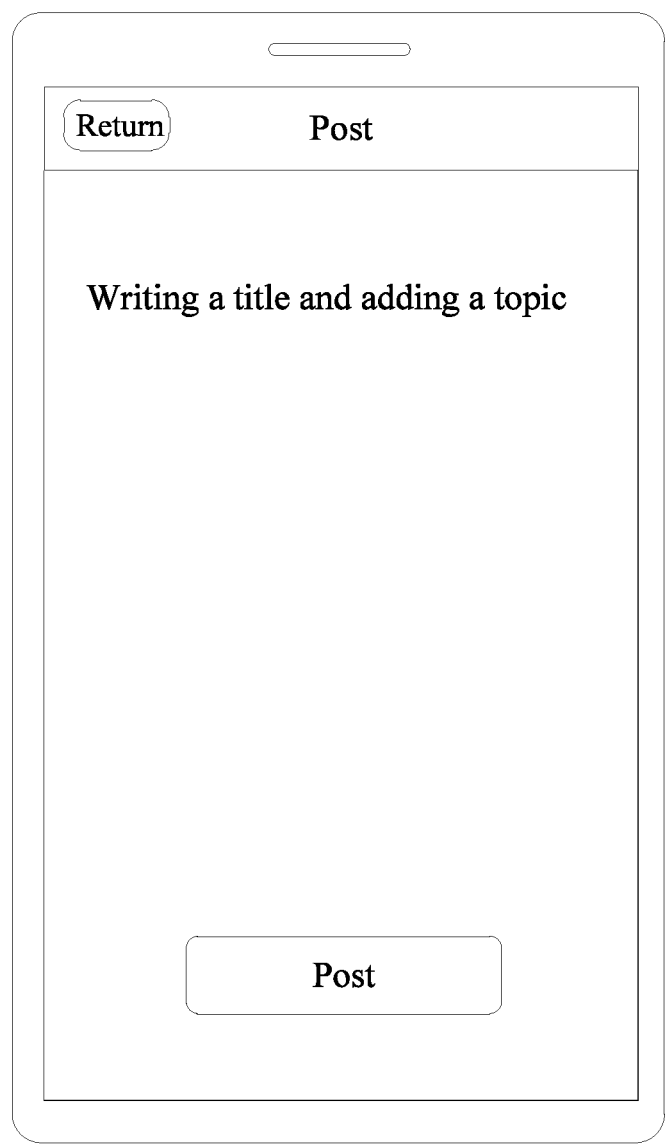
FIG. 2f is a schematic diagram of a to-be-posted page according to an exemplary embodiment.

After the editing is completed, the user may click the next button in FIG. 2e, and the terminal may display a to-be-posted page for posting the second highlight segment, and the to-be-posted page may be as shown in FIG. 2f. In the to-be-posted page, the user may add a title and a topic of the second highlight segment to be posted. The to-be-posted page may also provide a posting entry for posting the second highlight segment. For example, the posting entry may be presented in a form of a posting button, such as the posting button in FIG. 2f. When the user operates the posting entry, for example, clicks the posting button, the terminal may receive an posting instruction for the second highlight segment input by the user, and then posts the second highlight segment edited by the user.

After the second highlight segment is posted, when the user returns to the video playback page, the highlight sub-segment 201 is updated to the second highlight segment edited by the user, and the posting information used to indicate whether has been posted is updated to posted. After that, the user may takes the highlight sub-segment 202, the highlight sub-segment 203, and other highlight sub-segments or multiple highlight sub-segments as the first target highlight segment, and performs editing and posting.

In the present disclosure, in a case where the first target highlight segment includes multiple highlight sub-segments in the first highlight segment, in S103, the processing, according to the editing operation of the user the first target highlight segment to obtain the second highlight segment may include:

processing the multiple highlight sub-segments according to the editing operation of the user, and merging the processed plurality highlight sub-segments into the second highlight segment.

Among them, the user may select, according to his own needs, which highlight sub-segment in the first highlight segment to edit, and the terminal may process the multiple highlight sub-segments according to the editing operation of the user, and merge the processed multiple highlight sub-segments into the second highlight segment. The second highlight segment may be used as a collection of highlight segments edited by the user. The present disclosure does not specifically limit the order of respective processed highlight sub-segment in the merged second highlight segment during merging.

Figure 3A:
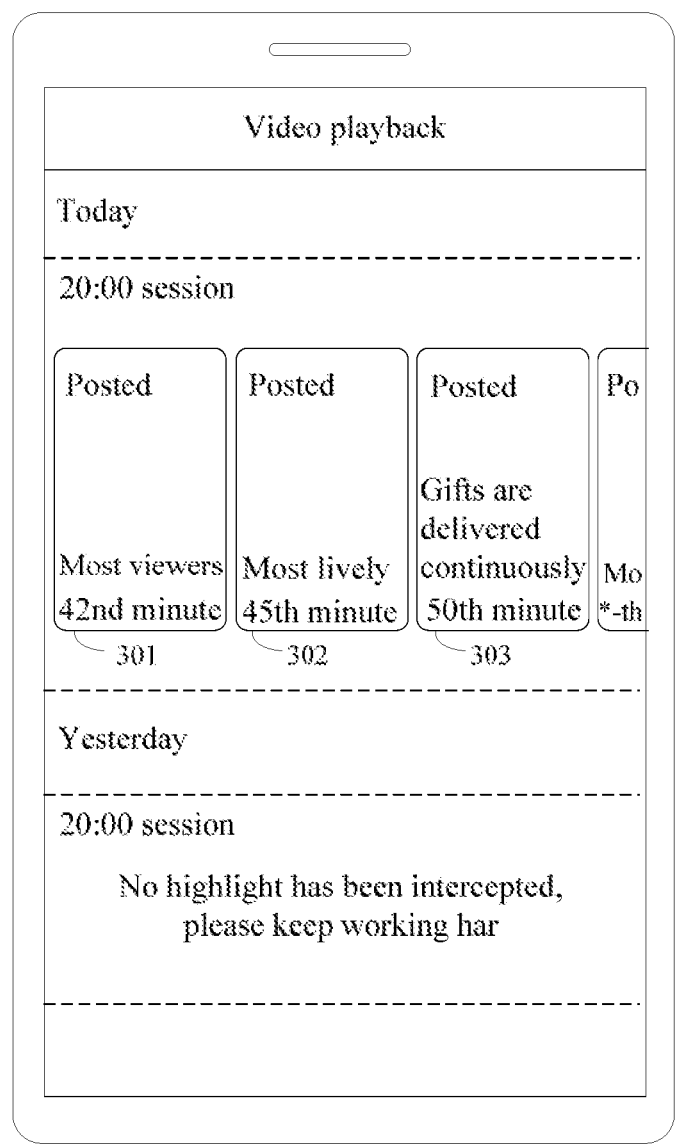
FIG. 3a is a schematic diagram of a video playback page according to another exemplary embodiment.

FIG. 3a is a schematic diagram of a video playback page according to another exemplary embodiment. As shown in FIG. 3a, the posted highlight segment 301 may correspond to the highlight sub-segment 201, the posted highlight segment 302 may correspond to the highlight sub-segment 202, and the posted highlight segment 303 may correspond to the highlight sub-segment 203.

In the present disclosure, the posted highlight segment may still be edited and posted again. The video processing method may further include:

in response to an editing instruction for a second target highlight segment, displaying an editing page corresponding to the second target highlight segment; processing, according to the editing operation of the user, the second target highlight segment to obtain a third highlight segment; and posting the third highlight segment in response to receiving a posting instruction for the third highlight segment.

Figure 3B:
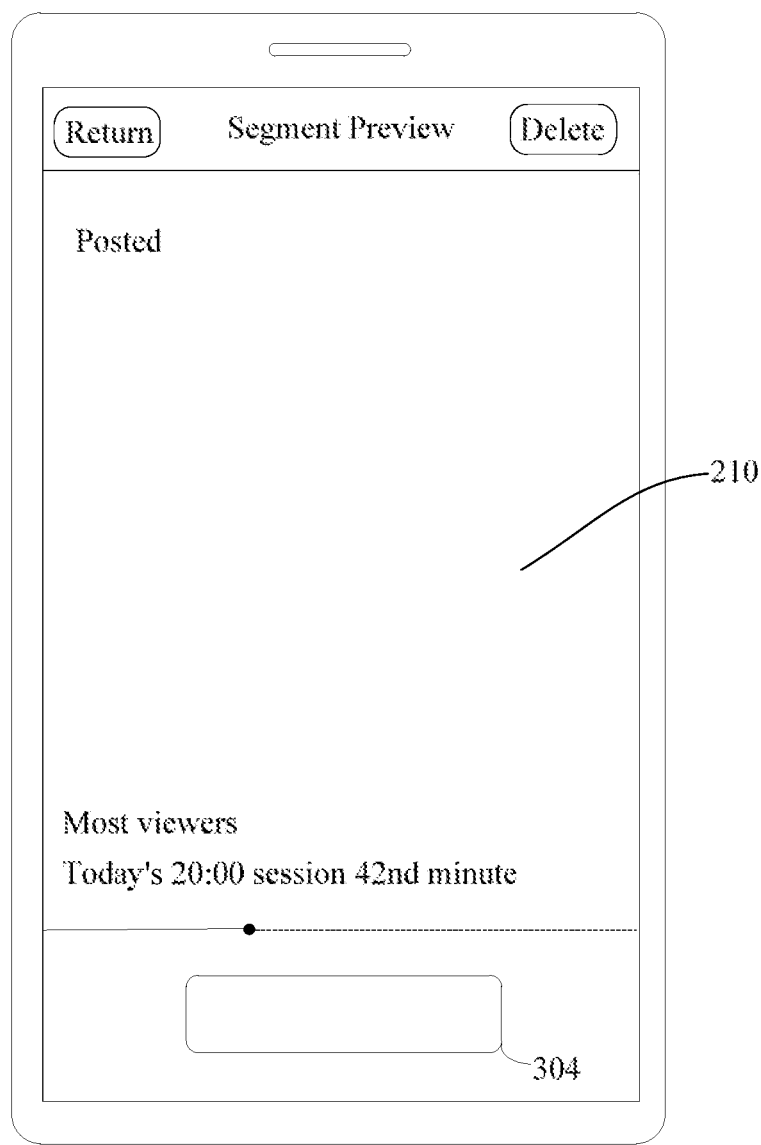
FIG. 3b is a schematic diagram of a preview page according to another exemplary embodiment.

Among them, the second target highlight segment may be any posted highlight segment. Exemplarily, the posted highlight segment 301 is used as the second target highlight segment. The user clicks on a cover image of the highlight segment 301 to generate a preview instruction for the second target highlight segment. After receiving the preview instruction, the terminal may display the preview page as shown in FIG. 3b. In the preview page, a re-editing entry may be provided, for example, the re-editing button 304 in the preview page, where the re-editing refers to a re-editing of the highlight sub-segment 201. The user may operate the re-editing entry, for example, click the re-editing button 304 to generate an editing instruction for the second target highlight segment. After receiving the editing instruction, the terminal may display an editing page corresponding to the second target highlight segment. The editing page is used by the user to perform an editing operation on the second target highlight segment. After that, the second target highlight segment is processed, according to the editing operation of the user, to obtain the third highlight segment. Among them, the editing page may also include a segment cropping page and an effect processing page, which may be shown in FIG. 2d and FIG. 2e, and will not be repeated here. Afterwards, after receiving the posting instruction for the third highlight segment input by the user, the terminal may post the third highlight segment.

Through the above technical solutions, the user may still edit and post the posted highlight segment, which can further meet the needs of the user and improve the user experience.

It should be noted that a representation of respective page in the figures provided in the present disclosure are only exemplary explanations, and do not constitute a limitation of the present disclosure. In practical applications, a representation of a page is not limited thereto.

Figure 4:
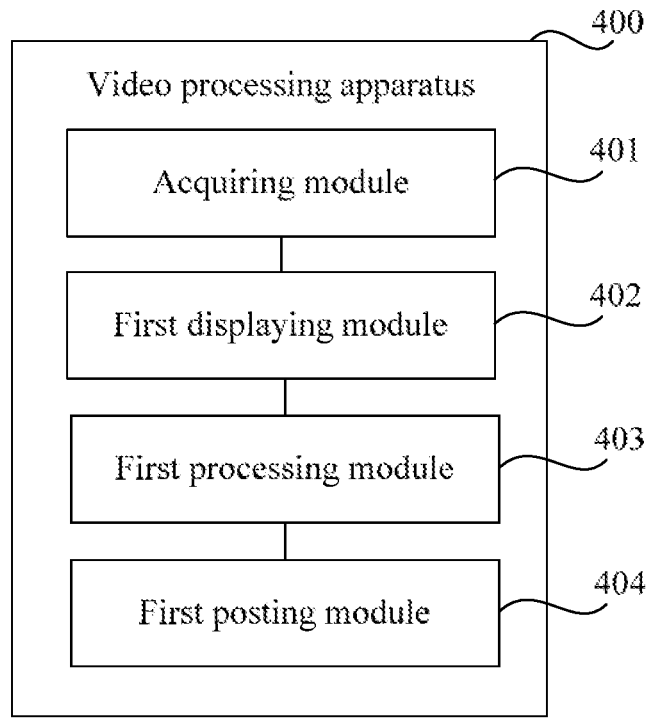
FIG. 4 is a block diagram of a video processing apparatus according to an exemplary embodiment.

Based on the same inventive concept, the present disclosure further provides a video processing apparatus, and FIG. 4 is a block diagram of a video processing apparatus according to an exemplary embodiment. As shown in FIG. 4, the video processing apparatus 400 may include:

an acquiring module 401, configured to acquire a first highlight segment obtained by performing highlight recognition on a target video;

a first displaying module 402, configured to display an editing page corresponding to the first target highlight segment in response to an editing instruction for a first target highlight segment, where the editing page is used by a user to perform an editing operation on the first target highlight segment;

a first processing module 403, configured to process, according to the editing operation of the user, the first target highlight segment to obtain a second highlight segment; and a first posting module 404, configured to post the second highlight segment in response to receiving a posting instruction for the second highlight segment.

Through the above technical solution, firstly, a first highlight segment obtained by performing highlight recognition on a target video is acquired, where the first highlight segment may be a spectacular segment in the target video. Furthermore, the terminal may provide an editing page for a user to perform an editing operation on the first target highlight segment. In this way, the user may edit and post a highlight segment that meet his own needs, so as to meet user needs and improve user experience. In addition, after the highlight segment is posted, a viewer may directly watch the highlight segment, that is, the highlight segment in the target video, which facilitates the video sharing by the viewer and improves viewing experience of the video.

In an implementation, the apparatus 400 may further include: a second displaying module, configured to display a video playback page, where the video playback page carries label information of the first highlight segment, and the label information is used to represent feature information of the first highlight segment after the acquiring module 401 acquires the first highlight segment obtained by performing the highlight recognition on the target video.

In an implementation, the first target highlight segment includes multiple highlight sub-segments in the first highlight segment; the apparatus 400 may further include: a merging module, configured to merge, according to a selecting operation of the user, the multiple highlight sub-segments to obtain the first target highlight segment before the first displaying module 403 displays the editing page corresponding to the first target highlight segment in response to the editing instruction for the first target highlight segment.

In an implementation, the first target highlight segment includes multiple highlight sub-segments in the first highlight segment; the first processing module 403 may be configured to process the multiple highlight sub-segments according to the editing operation of the user, and merge the processed multiple highlight sub-segments into the second highlight segment.

In an implementation, the apparatus 400 may further include: a third displaying module, a second processing module and a second posting module; where the third displaying module is configured to display an editing page corresponding to the second target highlight segment in response to an editing instruction for a second target highlight segment, where the second target highlight segment is any posted highlight segment, and the editing page is used by a user to perform an editing operation on the second target highlight segment; the second processing module is configured to process, according to the editing operation of the user, the second target highlight segment to obtain a third highlight segment; and the second posting module is configured to post the third highlight segment in response to receiving a posting instruction for the third highlight segment.

In an implementation, the acquiring module 401 is configured to acquire the target video; perform highlight recognition on the target video to obtain the first highlight segment; or send the target video to a server, whereby the server performs highlight recognition on the target video; and acquire the first highlight segment according to a highlight recognition result of the server.

In an implementation, the apparatus 400 may further include: a prompting module, configured to display prompt information during a process of acquiring the first highlight segment by the acquiring module 401, where the prompt information is used to prompt that the user is performing highlight recognition on the target video.

In an implementation, the apparatus 400 may further include: a fourth displaying module, configured to display a preview page corresponding to the first target highlight segment to play the first target highlight segment in response to a preview instruction for the first target highlight segment before the first displaying module 402 displays the editing page corresponding to the first target highlight segment in response to the editing instruction for the first target highlight segment.

In the following, reference is made to FIG. 5, which shows a schematic structural diagram of an electronic device 500 suitable for implementing an embodiment of the present disclosure. The electronic device in an embodiment of the present disclosure may include, but are not limited to, mobile terminals such as a mobile phone, a notebook computer, a digital broadcast receiver, a PDA (personal digital assistants), a PAD (portable android device), a PMP (portable multimedia player), a vehicle-mounted terminal (such as a vehicle navigation terminal), etc., and stationary terminals such as a digital TV, a desktop computer, etc. The electronic device shown in FIG. 6 is only an example, which should not impose any limitation on the function and applying scope of the embodiments of the present disclosure.

Figure 5:
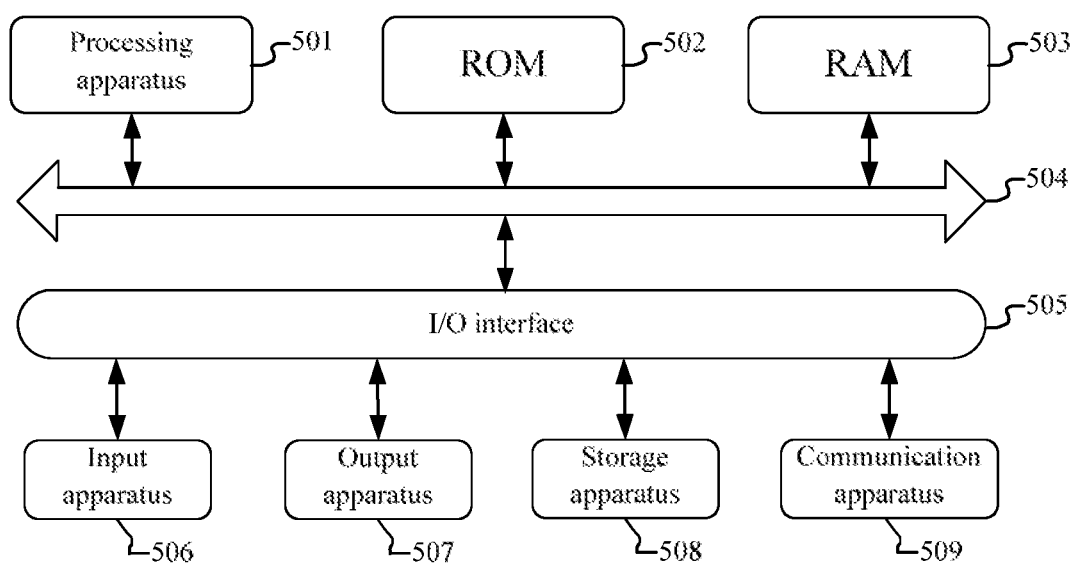
FIG. 5 is a schematic structural diagram of an electronic device according to an exemplary embodiment.

As shown in FIG. 5, an electronic device 500 may include a processing apparatus (e.g., a central processing unit, a graphics processor, etc.) 501 that that may perform various appropriate actions and processes according to a program stored in a read only memory (ROM) 502 or a program loaded from a storage apparatus 508 into a random access memory (RAM) 503. Various programs and data necessary for the operation of the electronic device 500 are further stored in the RAM 503. The processing apparatus 501, ROM 502, and RAM 503 are connected to each other through a bus 504. And an input/output (I/O) interface 505 is also connected to the bus 504.

Generally, the following apparatuses may be connected to the I/O interface 505: an input apparatus 506 including, for example, a touch screen, a touchpad, a keyboard, a mouse, a camera, a microphone, an accelerometer, a gyroscope, etc.; an output apparatus 507 including, for example, a liquid crystal display (LCD), a speaker, a vibration, etc.; a storage apparatus 508 including, for example, a magnetic tape, a hard disk, etc.; and a communication apparatus 509. The communication apparatus 509 may allow the electronic device 500 to communicate wirelessly or by wire with other devices to exchange data. Although FIG. 6 shows the electronic device 500 having various apparatus, it should be understood that not all of the illustrated apparatuses are required to be implemented or provided. More or fewer apparatuses may alternatively be implemented or provided Specially, according to an embodiment of the present disclosure, the processes described above with reference to the flowcharts may be implemented as a computer software program. For example, an embodiment of the present disclosure include a computer program product including a non-transitory computer program carried on a computer-readable medium, where the computer program includes program code for performing the method illustrated in the flowchart. In such embodiment, the computer program may be downloaded and installed from a network via the communication apparatus 509, or installed from the storage apparatus 508, or installed from the ROM 502. When the computer program is executed by the processing apparatus 501, the steps in the methods of the embodiment of the present disclosure are executed to realize the above-mentioned function of the embodiment of the present disclosure.

According to some embodiments of the present disclosure, the present disclosure further provides a computer program stored in a readable storage medium, at least one processor of an electronic device may read the computer program from the readable storage medium, and the at least one processor executes the computer program, so that the electronic device executes the scheme provided by any of the above embodiments.

It should be noted that the computer-readable medium described in the present disclosure may be a computer-readable signal medium or a computer-readable storage medium or any combination thereof. The computer-readable storage medium may be, for example, but not limited to, an electrical, a magnetic, an optical, an electromagnetic, an infrared, or a semiconductor system, apparatus or device, or a combination thereof. More specific examples of the computer readable storage media may include, but are not limited to, an electrical connection with one or more wires, a portable computer disk, a hard disk, a random-access memory (RAM), a read only memory (ROM), an erasable programmable read only memory (EPROM or flash memory), an optical fiber, a portable compact disk read only memory (CD-ROM), an optical storage device, a magnetic storage device, or any suitable combination thereof. In the present disclosure, the computer-readable storage medium may be any tangible medium that includes or stores a program that may be used by or used in combination with an instruction execution system, apparatus, or device. And in the present disclosure, the computer-readable signal medium may include a data signal propagated in baseband or as part of a carrier wave, carrying computer-readable program code therein. Such propagated data signal may take a variety of forms, including but not limited to an electromagnetic signal, an optical signal, or any suitable combination thereof. The computer-readable signal medium may also be any computer-readable medium other than the computer-readable storage medium, and the computer-readable signal medium can transmit, propagate, or transport the program used by or used in combination with the instruction execution system, apparatus or device. The program code included on the computer readable medium may be transmitted through any suitable medium including, but not limited to, an electrical wire, an optical fiber cable, an RF (radio frequency), etc., or any suitable combination thereof.

In some embodiments, a client may use any currently known or future developed network protocol such as HTTP (HyperText Transfer Protocol) to communicate, and may be interconnected with any form or medium of digital data communication (e.g., a communication network). Examples of the communication network include a local area network (LAN), a wide area network (WAN), an internet (e.g., the Internet), and a peer-to-peer network (e.g., an ad hoc peer-to-peer network), as well as any currently known or future developed network.

The above-mentioned computer-readable medium may be included in the above-mentioned electronic device; or may exist alone without being assembled into the electronic device.

The above-mentioned computer-readable medium carries one or more programs, and when the above-mentioned one or more programs are executed by the electronic device, the electronic device is caused to: acquire a first highlight segment obtained by performing highlight recognition on a target video; display an editing page corresponding to the first target highlight segment in response to an editing instruction for a first target highlight segment, where the editing page is used by a user to perform an editing operation on the first target highlight segment; process, according to the editing operation of the user, the first target highlight segment to obtain a second highlight segment; and post the second highlight segment in response to receiving a posting instruction for the second highlight segment.

The computer program code for performing an operation of the present disclosure may be written in one or more programming languages or a combination thereof, where the above programming languages include but are not limited to an object-oriented programming language, such as Java, Smalltalk, and C++, as well as a conventional procedural programming language, such as "C" or similar programming languages. The program code may be executed entirely on a user computer, executed partly on a user computer, executed as a stand-alone software package, executed partly on a user computer and partly on a remote computer, or executed entirely on a remote computer or a server. In a case involving the remote computer, the remote computer may be connected to the user computer through any kind of network, including a local area network (LAN) or a wide area network (WAN), or may be connected to an external computer (e.g., connected via the Internet using an Internet service provider).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, a program segment, or a portion of code that includes one or more executable instructions for implementing a specified logical function. Furthermore, it should be noted that, in some alternative implementations, functions indicated in the blocks may occur in an order different from that indicated in the figures. For example, two blocks shown in succession may, in fact, be executed substantially concurrently, or the blocks may sometimes be executed in the reverse order, depending upon the functionality involved. It also should be noted that each block of the block diagrams and/or flowcharts, or a combination of blocks in the block diagrams and/or flowcharts may be implemented in a special purpose hardware-based system that perform a specified function or operation, or may be implemented in a combination of special purpose hardware and a computer instruction.

The involved modules described in embodiments of the present disclosure may be implemented by means of software, and may also be implemented by means of hardware. Among them, names of these modules do not constitute a limitation on the units per se under certain circumstances, for example, the acquiring module may also be described as "a first highlight segment acquiring module".

The foregoing functions described herein may be performed, at least in part, by one or more hardware logic components. For example, without limitation, exemplary types of hardware logic components that may be used include: a field programmable gate array (FPGA), an application specific integrated circuit (ASIC), an application specific standard product (ASSP), a system on chip (SOC), a complex programmable logical device (CPLD) and more.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but are not limited to, an electronic, a magnetic, an optical, an electromagnetic, an infrared, or a semiconductor system, apparatus, or device, or any suitable combination of the foregoing. More specific examples of machine-readable storage medium would include one or more wire-based electrical connections, portable computer disks, hard disks, random access memory (RAM), read only memory (ROM), erasable programmable read only memory (EPROM or flash memory), fiber optics, compact disk read only memory (CD-ROM), optical storage devices, magnetic storage devices, or any suitable combination of the foregoing.

According to one or more embodiments of the present disclosure, Example 1 provides a video processing method, including: acquiring a first highlight segment obtained by performing highlight recognition on a target video; displaying an editing page corresponding to the first target highlight segment in response to an editing instruction for a first target highlight segment, where the editing page is used by a user to perform an editing operation on the first target highlight segment; processing, according to the editing operation of the user, the first target highlight segment to obtain a second highlight segment; and posting the second highlight segment in response to receiving a posting instruction for the second highlight segment.

According to one or more embodiments of the present disclosure, Example 2 provides the method of Example 1, where after the acquiring the first highlight segment obtained by performing the highlight recognition on the target video, the method further includes: displaying a video playback page, where the video playback page carries label information of the first highlight segment, and the label information is used to represent feature information of the first highlight segment.

According to one or more embodiments of the present disclosure, Example 3 provides the method of Example 2, where the label information includes one or more of the following: a cover image, a conformed highlight recognition condition, time information in the target video, and posting information used to indicate whether has been posted.

According to one or more embodiments of the present disclosure, Example 4 provides the method of Example 1, where the first target highlight segment includes multiple highlight sub-segments in the first highlight segment; before the displaying the editing page corresponding to the first target highlight segment in response to the editing instruction for the first target highlight segment, the method further includes: merging, according to a selecting operation of the user, the multiple highlight sub-segments to obtain the first target highlight segment.

According to one or more embodiments of the present disclosure, Example 5 provides the method of Example 1, where the first target highlight segment includes multiple highlight sub-segments in the first highlight segment; the processing, according to the editing operation of the user, the first target highlight segment to obtain the second highlight segment includes: processing the multiple highlight sub-segments according to the editing operation of the user, and merging the processed multiple highlight sub-segments into the second highlight segment.

According to one or more embodiments of the present disclosure, Example 6 provides the method of Example 1, where the method further includes: displaying an editing page corresponding to the second target highlight segment in response to an editing instruction for a second target highlight segment, where the second target highlight segment is any posted highlight segment, and the editing page is used by a user to perform an editing operation on the second target highlight segment; processing, according to the editing operation of the user, the second target highlight segment to obtain a third highlight segment; and posting the third highlight segment in response to receiving a posting instruction for the third highlight segment.

According to one or more embodiments of the present disclosure, Example 7 provides the method of Example 1, where the acquiring the first highlight segment obtained by performing the highlight recognition on the target video includes: acquiring the target video; and performing highlight recognition on the target video to obtain the first highlight segment; or, sending the target video to a server, whereby the server performs highlight recognition on the target video; and acquiring the first highlight segment according to a highlight recognition result of the server.

According to one or more embodiments of the present disclosure, Example 8 provides the method of Example 1, where the method further includes: displaying prompt information during a process of acquiring the first highlight segment, where the prompt information is used to prompt that the user is performing highlight recognition on the target video.

According to one or more embodiments of the present disclosure, Example 9 provides the method of Example 1, where before the displaying the editing page corresponding to the first target highlight segment in response to the editing instruction for the first target highlight segment, the method further includes: in response to a preview instruction for the first target highlight segment, displaying a preview page corresponding to the first target highlight segment to play the first target highlight segment.

According to one or more embodiments of the present disclosure, Example 10 provides the method of any one of Examples 1 to 9, where the target video is a live playback video.

According to one or more embodiments of the present disclosure, Example 11 provides a video processing apparatus, including: an acquiring module, configured to acquire a first highlight segment obtained by performing highlight recognition on a target video; a first displaying module, configured to display an editing page corresponding to the first target highlight segment in response to an editing instruction for a first target highlight segment, where the editing page is used by a user to perform an editing operation on the first target highlight segment; a first processing module, configured to process, according to the editing operation of the user, the first target highlight segment to obtain a second highlight segment; and a first posting module, configured to post the second highlight segment in response to receiving a posting instruction for the second highlight segment.

According to one or more embodiments of the present disclosure, Example 12 provides a computer-readable medium having a computer program stored thereon, where the program implements the method described in Examples 1 to 10 when executed by a processor.

According to one or more embodiments of the present disclosure, Example 13 provides an electronic device, including: a storage apparatus having a computer program stored thereon; and a processing apparatus, configured to execute the computer program in the storage apparatus, to implement a step of the method described in Examples 1 to 10.

According to one or more embodiments of the present disclosure, Example 14 provides a computer program product, including computer program instructions which, enable a computer to perform a step of the method as described in any of Examples 1 to 10.

According to one or more embodiments of the present disclosure, Example 15 provides a computer program that enables a computer to perform a step of the method as described in any one of Examples 1 to 10.

The above descriptions are merely a preferred embodiment of the present disclosure and illustrations of an applied technical principle. The person skilled in the art should understand that a disclosure scope involved in the present disclosure is not limited to the technical solution formed by the specific combination of the above-mentioned technical features, and should also cover other technical solutions formed by any combination of the above technical features or their equivalents without departing from the above disclosure concept. For example, a technical solution formed by replacing the above features with the technical features with similar functions disclosed in the present disclosure (but not limited to).

In addition, although operations are depicted in a particular order, it should not be understood as requiring these operations to be performed in the specific order shown or in sequential order. Under a certain circumstance, multitasking and parallel processing may be advantageous. Likewise, although the above discussion contains several implementation-specific details, these should not be interpreted as limiting the scope of the present disclosure. Certain features described in the context of individual embodiments may also be implemented in combination in a single embodiment. Conversely, various features described in the context of a single embodiment may also be implemented in multiple embodiments individually or in any suitable sub-combination.

Although the subject matter has been described in language specific to a structural feature and/or a methodological action, it should be understood that the subject matter defined in the appended claims is not necessarily limited to the specific features or actions described above. On the contrary, the specific feature and action described above are merely an example form of implementing the claims. Regarding the apparatus in the above-mentioned embodiment, the specific manner in which respective module performs the operation has been described in detail in the embodiment of the method, which will not be described in detail herein.

What is claimed is:

1. A video processing method, comprising:
    acquiring a first highlight segment obtained by performing highlight recognition on a target video;
    displaying an editing page corresponding to the first target highlight segment in response to an editing instruction for a first target highlight segment, wherein the editing page is used by a user to perform an editing operation on the first target highlight segment;
    processing, according to the editing operation of the user, the first target highlight segment to obtain a second highlight segment; and
    posting the second highlight segment in response to receiving a posting instruction for the second highlight segment,
    wherein after the acquiring the first highlight segment obtained by performing the highlight recognition on the target video, the method further comprises:
    displaying label information of the first highlight segment, and the label information is used to represent feature information of the first highlight segment,
    wherein the label information comprises a conformed highlight recognition condition,
    wherein the first target highlight segment comprises multiple highlight sub-segments in the first highlight segment;
    before the displaying the editing page corresponding to the first target highlight segment in response to the editing instruction for the first target highlight segment, the method further comprises:
    merging, according to a selecting operation of the user, the multiple highlight sub-segments to obtain the first target highlight segment.

2. The method according to claim 1, wherein the label information comprises one or more of the following: a cover image, time information in the target video, and posting information used to indicate whether has been posted.

3. The method according to claim 1, wherein the first target highlight segment comprises multiple bighlight sub-segments in the first highlight segment;
    the processing, according to the editing operation of the user, the first target highlight segment to obtain the second highlight segment comprises:
    processing the multiple highlight sub-segments according to the editing operation of the user, and merging the processed multiple highlight sub-segments into the second highlight segment.

4. The method according to claim 1, further comprising:
    displaying an editing page corresponding to the second target highlight segment in response to an editing instruction for a second target highlight segment, wherein the second target highlight segment is any posted highlight segment, and the editing page corresponding to the second target highlight segment is used by a user to perform an editing operation on the second target highlight segment;
    processing, according to the editing operation on the second target highlight segment, the second target highlight segment to obtain a third highlight segment; and
    posting the third highlight segment in response to receiving a posting instruction for the third highlight segment.

5. The method according to claim 1, wherein the acquiring the first highlight segment obtained by performing the highlight recognition on the target video comprises:
    acquiring the target video; and
    performing highlight recognition on the target video to obtain the first highlight segment; or, sending the target video to a server, whereby the server performs highlight recognition on the target video; and acquiring the first highlight segment according to a highlight recognition result of the server.

6. The method according to claim 1, further comprising:
    displaying prompt information during a process of acquiring the first highlight segment, wherein the prompt information is used to prompt that the user is performing highlight recognition on the target video.

7. The method according to claim 1, wherein before the displaying the editing page corresponding to the first target highlight segment in response to the editing instruction for the first target highlight segment, the method further comprises:
    in response to a preview instruction for the first target highlight segment, displaying a preview page corresponding to the first target highlight segment to play the first target highlight segment.

8. The method according to claim 1, wherein the target video is a live playback video.

9. An electronic device, comprising:
    one or more processors; and
    a memory having one or more programs stored thereon,
    wherein, when the one or more programs are executed by the one or more processors, the one or more processors are enabled to:

acquire a first highlight segment obtained by performing highlight recognition on a target video;

display an editing page corresponding to the first target highlight segment in response to an editing instruction for a first target highlight segment, wherein the editing page is used by a user to perform an editing operation on the first target highlight segment;

process, according to the editing operation of the user, the first target highlight segment to obtain a second highlight segment; and post the second highlight segment in response to receiving a posting instruction for the second highlight segment, wherein after the acquire the first highlight segment obtained by performing the highlight recognition on the target video, the one or more processors are further enabled to:

display label information of the first highlight segment, and the label information is used to represent feature information of the first highlight segment, wherein the label information comprises a conformed highlight recognition condition, wherein the first target highlight segment comprises multiple highlight sub-segments in the first highlight segment;

before the display of the editing page corresponding to the first target highlight segment in response to the editing instruction for the first target highlight segment, the one or more processors are further enabled to:

merge, according to a selecting operation of the user the multiple highlight sub-segments to obtain the first target highlight segment.

10. The electronic device according to claim 9, wherein the first target highlight segment comprises multiple highlight sub-segments in the first highlight segment;

the one or more processors are further enabled to:

process the multiple highlight sub-segments according to the editing operation of the user, and merge the processed multiple highlight sub-segments into the second highlight segment.

11. The electronic device according to claim 9, wherein the first target highlight segment comprises multiple highlight sub-segments in the first highlight segment;

the one or more processors are further enabled to:

process the multiple highlight sub-segments according to the editing operation of the user, and merge the processed multiple highlight sub-segments into the second highlight segment.

12. The electronic device according to claim 9, wherein the one or more processors are further enabled to:

display an editing page corresponding to the second target highlight segment in response to an editing instruction for a second target highlight segment, wherein the second target highlight segment is any posted highlight segment, and the editing page corresponding to the second target highlight segment is used by a user to perform an editing operation on the second target highlight segment;

process, according to the editing operation on the second target highlight segment, the second target highlight segment to obtain a third highlight segment; and post the third highlight segment in response to receiving a posting instruction for the third highlight segment.

13. The electronic device according to claim 9, wherein the one or more processors are further enabled to:

acquire the target video; and perform highlight recognition on the target video to obtain the first highlight segment; or, sending the target video to a server, whereby the server performs highlight recognition on the target video; and acquiring the first highlight segment according to a highlight recognition result of the server.

14. The electronic device according to claim 9, wherein the one or more processors are further enabled to:

display prompt information during a process of acquiring the first highlight segment, wherein the prompt information is used to prompt that the user is performing highlight recognition on the target video.

15. The electronic device according to claim 9, wherein the one or more processors are further enabled to:

in response to a preview instruction for the first target highlight segment, display a preview page corresponding to the first target highlight segment to play the first target highlight segment.

16. A non-transitory computer-readable medium having a computer program stored thereon, wherein when the program is executed by a processor, the processor is enabled to:

acquire a first highlight segment obtained by performing highlight recognition on a target video;

display an editing page corresponding to the first target highlight segment in response to an editing instruction for a first target highlight segment, wherein the editing page is used by a user to perform an editing operation on the first target highlight segment;

process, according to the editing operation of the user, the first target highlight segment to obtain a second highlight segment; and post the second highlight segment in response to receiving a posting instruction for the second highlight segment, wherein after the acquire the first highlight segment obtained by performing the highlight recognition on the target video, the processor is further enabled to:

display label information of the first highlight segment, and the label information is used to represent feature information of the first highlight segment, wherein the label information comprises a conformed highlight recognition condition, wherein the first target highlight segment comprises multiple highlight sub-segments in the first highlight segment;

before the displaying the editing page corresponding to the first target highlight segment in response to the editing instruction for the first target highlight segment, the processor is further enabled to:

merge, according to a selecting operation of the user, the multiple highlight sub-segments to obtain the first target highlight segment.

\* \* \* \* \*